_(12)_ United States Patent
Lien et al.

(10) Patent No.: US 8,219,787 B2
(45) Date of Patent: *Jul. 10, 2012

(54) EARLY RELEASE OF RESOURCES BY PROCEEDING TO RETIRE STORE OPERATIONS FROM EXCEPTION REPORTING STAGE BUT KEEPING IN LOAD/STORE QUEUE

(75) Inventors: Wei-Han Lien, San Jose, CA (US);
Po-Yung Chang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,345

(22) Filed: May 9, 2011

(65) Prior Publication Data

US 2011/0214127 A1    Sep. 1, 2011

Related U.S. Application Data

(63) Continuation of application No. 12/323,266, filed on Nov. 25, 2008, now Pat. No. 7,962,730, which is a continuation of application No. 11/546,074, filed on Oct. 10, 2006, now Pat. No. 7,472,260.

(51) Int. Cl.
*G06F 9/38* (2006.01)
(52) U.S. Cl. ........................ 712/219; 712/225
(58) Field of Classification Search ............. None
See application file for complete search history.

(56) References Cited

U.S. PATENT DOCUMENTS

| | | | |
|---|---|---|---|
| 5,420,991 A | 5/1995 | Konigsfeld et al. |
| 5,519,841 A | 5/1996 | Sager et al. |
| 5,721,857 A | 2/1998 | Glew et al. |
| 6,442,707 B1 | 8/2002 | McGrath et al. |
| 6,473,832 B1 | 10/2002 | Ramagopal et al. |
| 6,493,820 B2 | 12/2002 | Akkary et al. |
| 6,564,315 B1 | 5/2003 | Keller et al. |
| 6,622,237 B1 | 9/2003 | Keller et al. |
| 7,003,648 B2 | 2/2006 | Chrysos et al. |
| 2005/0251660 A1 | 11/2005 | Bell et al. |

OTHER PUBLICATIONS

P.A. Semi, "The PWRficient Processor Family," Oct. 2005, pp. 1-31.

*Primary Examiner* — Kenneth Kim
(74) *Attorney, Agent, or Firm* — Lawrence J. Merkel; Meyertons, Hood, Kivlin, Kowert & Goetzel, P.C.

(57) ABSTRACT

In one embodiment, a processor comprises a retire unit and a load/store unit coupled thereto. The retire unit is configured to retire a first store memory operation responsive to the first store memory operation having been processed at least to a pipeline stage at which exceptions are reported for the first store memory operation. The load/store unit comprises a queue having a first entry assigned to the first store memory operation. The load/store unit is configured to retain the first store memory operation in the first entry subsequent to retirement of the first store memory operation if the first store memory operation is not complete. The queue may have multiple entries, and more than one store may be retained in the queue after being retired by the retire unit.

21 Claims, 5 Drawing Sheets

EARLY RELEASE OF RESOURCES BY PROCEEDING TO RETIRE STORE OPERATIONS FROM EXCEPTION REPORTING STAGE BUT KEEPING IN LOAD/STORE QUEUE

This application is a continuation of U.S. patent application Ser. No. 12/323,266, filed Nov. 25, 2008 now U.S. Pat. No. 7,962,730, which is a continuation of U.S. patent application Ser. No. 11/546,074, filed on Oct. 10, 2006 now U.S. Pat. No. 7,472,260, all of which are incorporated herein by reference in their entirety.

BACKGROUND

1. Field of the Invention

This invention is related to the field of processors and, more particularly, to handling store memory operations in processors.

2. Description of the Related Art

Processors generally include support for load and store memory operations to facilitate transfer of data between the processors and memory to which the processors may be coupled. A load memory operation (or, more briefly, a load) is a memory operation specifying a transfer of data from a main memory to the processor (although the transfer may be completed in cache). A store memory operation (or, more briefly, a store) is a memory operation specifying a transfer of data from the processor to memory. Loads and stores may be an implicit part of an instruction which includes a memory operation, or may be explicit instructions.

Stores are often executed and placed in a queue within a load/store unit to await non-speculative status. Once a store is non-speculative, the corresponding store data can be committed to memory (in cache or in the main memory system) and then the store can be retired. Typically, store data can be forwarded from the queue for subsequent loads that access one or more bytes updated by the store. Accordingly, committing the store data to memory and retiring the store operations are typically given a low priority in the processor. In many cases, the store may become the oldest operation outstanding in the processor before retiring.

Unfortunately, the low priority for committing store data can impact the performance of the processor. For example, processors typically retire instructions in program order. Accordingly, if a store has not been retired, younger instructions (according to the program order) also cannot be retired. Buffering for such instructions and/or their results may fill, which may cause stalls in instruction execution until the buffering can be reduced from full status. An instruction is younger than another instruction if it is subsequent to the other instruction in program order. An instruction is older than another instruction if the instruction is prior to the other instruction in program order. Similarly, instructions may be indicated as being prior to or subsequent to other instructions, or may be referred to as previous instructions, preceding instructions, subsequent instructions, etc. Such references may refer to the program order of the instructions. The program order at any given point in time may be a predicted order (e.g. via branch prediction schemes).

SUMMARY

In one embodiment, a processor comprises a retire unit and a load/store unit coupled thereto. The retire unit is configured to retire a first store memory operation responsive to the first store memory operation having been processed at least to a pipeline stage at which exceptions are reported for the first store memory operation. The load/store unit comprises a queue having a first entry assigned to the first store memory operation. The load/store unit is configured to retain the first store memory operation in the first entry subsequent to retirement of the first store memory operation if the first store memory operation is not complete. The queue may have multiple entries, and more than one store may be retained in the queue after being retired by the retire unit.

In another embodiment, a method is contemplated. A first store memory operation is retired responsive to the first store memory operation having been processed at least to a pipeline stage at which exceptions are reported for the first store memory operation. The first store memory operation is retained in a first entry in a queue within a load/store unit assigned to the first store memory operation subsequent to retirement of the first store memory operation if the first store memory operation is not complete.

In yet another embodiment, a scheduler comprises a buffer and a retire unit coupled thereto. The buffer is configured to store instruction operations awaiting issue, including a first store memory operation. The retire unit is configured to retire the first store memory operation from the buffer responsive to the first store memory operation having been processed at least to a pipeline stage at which exceptions are reported and prior to the first store memory operation being completed.

BRIEF DESCRIPTION OF THE DRAWINGS

The following detailed description makes reference to the accompanying drawings, which are now briefly described.

Figure 1:
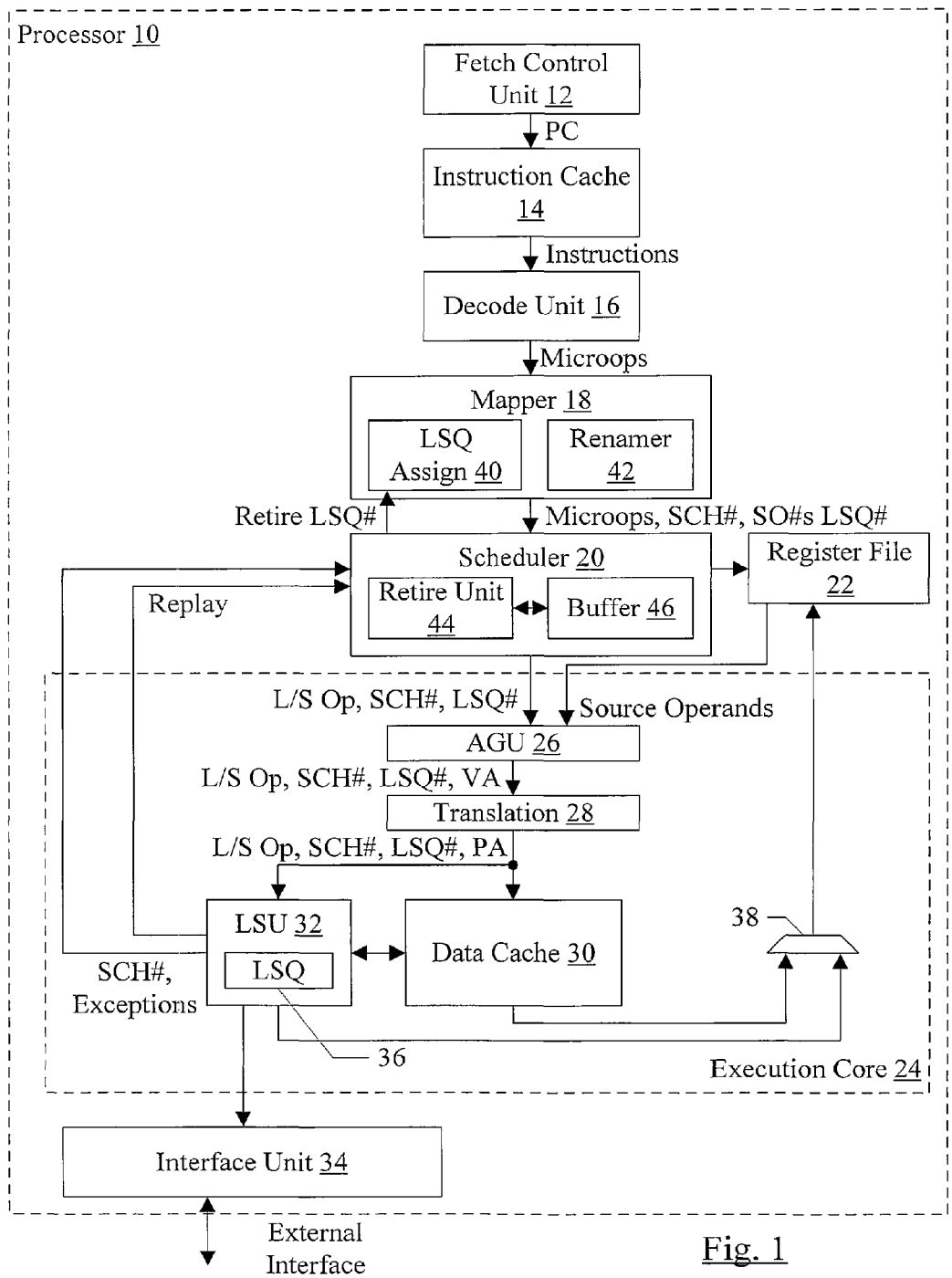
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A store instruction may generally include any instruction defined in the instruction set architecture implemented by the processor that causes a store memory operation. Thus, store instructions may include instructions that implicitly specify a store. Store instructions may also include explicit store instructions. A store, store operation, or store memory operation may include an operation generated within the processor that is to be executed by the processor to perform a store (or part of a store). In some embodiments, the processor may generate one or more micro-operations (microops) for each instruction defined in the instruction set architecture. In such embodiments, store microops may be generated. In other embodiments, microop generation may not be performed (e.g. most instructions in the instruction set architecture may be directly executed in the processor) and there may be a one-to-one correspondence between store instructions and store memory operations. A load instruction may similarly include any instruction defined in the instruction set architecture implemented by the processor that causes a load memory operation. A load, load operation, or load memory operation may include an operation generated within the processor that is to be executed by the processor to perform a load (or part of a load).

An example implementation will be described in more detail below for an embodiment of a processor that implements an instruction set architecture that includes explicit load/store instructions. Particularly, the PowerPC™ instruction set architecture will be used as an example. Other instruction set architectures may be implemented in other embodiments, including instruction set architectures that include implicit memory operations. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc.

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. In the illustrated embodiment, the execution core 24 includes an address generation unit (AGU) 26, a translation unit 28, a data cache 30, and a load/store unit 32 (which includes a load/store queue 36). The fetch control unit 12 is coupled to provide a program counter (PC) for fetching from the instruction cache 14. The instruction cache 14 is coupled to provide instructions to the decode unit 16, which is coupled to provide microops to the mapper 18. The mapper 18 includes a load/store queue (LSQ) assign unit 40 and a renamer 42. The mapper 18 is coupled to provide microops, a scheduler number (SCH#), source operand numbers (SO#s), and a load/store queue number (LSQ#) to the scheduler 20. The scheduler 20 includes a retire unit 44 coupled to a buffer 46 in the illustrated embodiment. The scheduler 20 is coupled to receive a replay signal and a SCH# and exception indications from the load/store unit (LSU) 32, is coupled to the register file 22, and is coupled to provide load/store microops (L/S Op) for execution to the address generation unit 26 along with an SCH# and an LSQ#. The register file is coupled to provide operands to the address generation unit 26, and is coupled to receive results to be written to the register file 22 from a mux 38. The mux 38 is coupled to receive data from the data cache 30 and the LSU 32. The scheduler 20 is further configured to provide a retire LSQ# to the mapper 18 (more particularly, to the LSQ assign unit 40). The address generation unit 26 is configured to provide a virtual address (VA) to the translation unit 28, along with the L/S op, the SCH#, and the LSQ#. The translation unit 28 is configured to provide a corresponding physical address (PA) along with the L/S op, the SCH#, and the LSQ#, to the data cache 30 for access, and also provides the information to the LSU 32. The LSU 32 is coupled to the data cache 30 and the interface unit 34, which is further coupled to an external interface of the processor 10.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations Generally, an instruction operation may be an operation that the hardware included in the execution core 24 is capable of executing. Each instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment.

Microops generated by the decode unit 16 may be provided to the mapper 18. The mapper 18 may implement register renaming (e.g. in the renamer 42) to map source register addresses from the microops to the source operand numbers (SO#s) identifying the renamed source registers. Additionally, the renamer 42 may assign a scheduler entry to store each microop, identified by the SCH#. In one embodiment, the SCH# may also identify the rename register assigned to the destination of the microop. In other embodiments, the renamer 42 may assign a separate destination register number. The LSQ assign unit 40 may assign an LSQ entry in the LSQ 36 to load/store memory operations. Thus, each load/store memory operation may have its entry in the LSQ 36 preassigned, prior to issuance. The load/store operations may be issued out of order, in some embodiments, and the LSQ 36 may ensure ordering where appropriate (e.g. for loads/store operations to the same address or overlapping addresses, when synchronization or in-order processing is required by the translation attributes, etc.).

The LSQ assign unit 40 may record which LSQ entries are free to be assigned in any desired fashion. For example, in one embodiment, the LSQ entries may be freed upon retirement of the operations to which they are assigned (e.g. signalled by the scheduler 20 via the retire LSQ# signal). In one embodiment, operations may be retired from the scheduler 20 in program order. In such an embodiment, the LSQ assign unit 40 may maintain head and tail pointers indicating the range of currently free LSQ entries. In other embodiments, a bit vector having a bit for each LSQ entry may be maintained, where a set bit may indicate that the corresponding LSQ entry is free and a clear bit many indicate that the corresponding LSQ entry is in use (or vice-versa).

The mapper 18 may provide the microops, along with SCH#, SO#s, and LSQ# (if applicable) for each microop to scheduler 20. The scheduler 20 may store the microops in the scheduler entries identified by the respective SCH#s, along with the SO#s and LSQ#. More particularly, the buffer 46 may comprise the scheduler entries and may be written with the microops and related state. The buffer 46 may comprise any memory (e.g. one or more random access memory arrays, clocked storage devices such as flops, latches, registers, etc., or combinations of memory arrays and clocked storage devices).

The scheduler 20 may schedule the microops for execution in the execution core 24. When a microop is scheduled, the scheduler 20 may read its source operands from the register file 22 and the source operands may be provided to the execution core 24. For load/store operations, the source operands include address operands used to generate the address of the memory location accessed by the load/store operation. Address operands of a load/store operation may include register operands provided from the register file 22 as well as displacement operands encoded in the load/store microop itself.

Load/store operations may be scheduled to the address generation unit 26, which generates the address of the load/store operation from the address operands. If address translation is enabled, the address generated by the address generation unit 26 may be an effective address or virtual address, to be translated to a physical address through the address translation mechanism. In the illustrated embodiment, the translation unit 28 may perform the address translation, generating the physical address. In other embodiments, the translation mechanism may be included in the data cache 30. The translation unit 28 may comprise, for example, a translation lookaside buffer (TLB) that caches previously used translations. In one implementation that implements that PowerPC instruction set architecture, the translation unit 28 may comprise an effective to real address translation (ERAT) table that caches the result of translating effective addresses to real (physical) addresses. In some embodiments, the translation unit 28 may also implement hardware to walk the translation tables (typically created by software and stored in memory) in the event of a miss for a translation in the TLB, ERAT, or other translation caching structure. Any translation hardware may be implemented in various embodiments.

In addition to providing virtual to physical address translations, the translation unit 28 may provide various translation attributes defined in the translation mechanism. For example, the translation attributes may include access permissions such as read/write access permissions which may be controlled on a privilege level basis, in some embodiments. The translation attributes may also include other controls, such as cacheability, coherency, etc. In some cases, a given load/store operation may result in an exception due to the translation attributes. In the illustrated embodiment, the exceptions may be reported by the LSU 32. In other embodiments, the translation unit 28 may report the exceptions.

The address from the translation unit 28 is provided to the data cache 30 and to the LSU 32. For load microops, the load data may be provided from either the data cache 30 or the LSU unit 32 through the mux 38. For example, the data may be provided by LSU 32 from the LSQ 36, if the load accesses bytes updated by a previous uncommitted store that is in the LSQ 36. The data may be provided from the data cache 30 if the load is a hit in the data cache 30 and the data is not provided from a previous uncommitted store in the LSQ 36. In some embodiments, a memory request buffer (not shown) in the interface unit 34 may be used as a store merge buffer for committed stores, and data may be forwarded from the memory request buffer as well.

For store operations, the LSU 32 may write the store address and store data to the LSQ entry identified by the LSQ# provided with the store operation. Load operations may also be written to the LSQ 36 (e.g. for ordering purposes or to await fill data in the event of a cache miss). If any exceptions have been detected (by the translation unit 28 or other exception sources), the LSU 32 may transmit the SCH# of the operation and identify the exception(s) detected. In one embodiment, the LSU 32 may signal a lack of exceptions if none were detected, to provide a positive acknowledgement that an operation has reached the LSQ 36. In other embodiments, the scheduler 20 may track which operations are in the various pipeline stages of the execution core 24, and the SCH# may not be used to identify the exceptions.

The scheduler 20 (and more particularly the retire unit 44) may be configured to retire store operations responsive to the store operations having been processed at least to the point of reporting exceptions. The exceptions may be reported prior to the store operations being completed. Processing of the store operations beyond the exception reporting, however, may not result in additional exceptions (or at least those exceptions required to be precise). For example, an error correcting code (ECC) exception may be detected during the cache update for a store operation, but such an exception may be permitted to be imprecise.

By retiring the stores in response to exception reporting, the buffer entry in the buffer 46 that is assigned to the store operation may be freed earlier than if retirement awaited the completion of the store operation, in some cases. Additionally, microops subsequent to the store operation in the buffer 46 may be retired, if ready to retire, more rapidly. Thus, these buffer entries may also become available more rapidly. Performance may be increased for a given number of buffer entries in the buffer 46, in some embodiments. In other embodiments, fewer buffer entries may be implemented in the buffer 46 to achieve a desired performance level.

More specifically, in one embodiment, the processor 10 may implement a strongly-ordered memory model to ensure sequential consistency is maintained. However, stores may be speculatively retired from the scheduler 20 after exception reporting has been completed for the stores. For example, in one embodiment, the following may occur during processing of a load operation in the processor 10: the LSU 32 may signal the scheduler 20 that the load operation has been processed to the point that replay and/or exceptions are detected; the scheduler 20 may signal the LSU 32 when the load is non-speculative and may be retired; the LSU 32 may signal the scheduler 20 when the load has been retired from the LSQ 36; and the scheduler 20 may retire the load and free the scheduler entry and the LSQ entry (by signalling the LSQ assign unit 40). For stores, the LSU 32 may signal the scheduler 20 that the store has been processed to the point of exception/replay detection (and may report any exceptions), and the scheduler 20 may retire the store in response (including indicating to the LSQ assign unit 40 that the LSQ entry assigned to the store is free). Loads are not retired early, and may be replayed to preserve strong-ordering and sequential consistency.

Even subsequent to retirement of the store operation, the LSU 32 may retain the store operation in the entry in the LSQ 36 assigned to the store operation, if the store operation is not yet completed. Completing the store operation may refer to ensuring that the update made by the store operation either has occurred or will occur before a subsequent read of the data. Completing the store operation may include committing the store data. For example, completing the store operation may include updating the data cache 30 with the store data (for a cacheable store). In some embodiments, as mentioned above, the memory request buffer in the interface unit 34 may be used as a store merge buffer, and completing the store operation may include updating the cache block in the merge buffer. For noncacheable stores, completing the store operation may include transmitting the store operation to the interface unit 34 to be transmitted on the external interface. In some embodiments, completing a noncacheable store may include successful transmission of the address phase of the transaction on the external interface.

Figure 2:
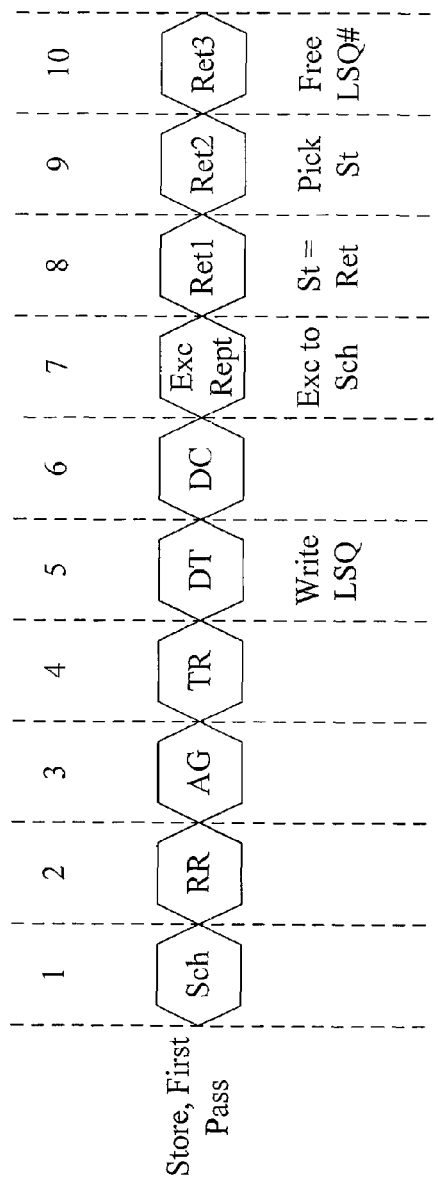
FIG. 2 is a timing diagram illustrating a plurality of pipeline stages processing a store memory operation during a first pass through the pipeline.
Figure 3:
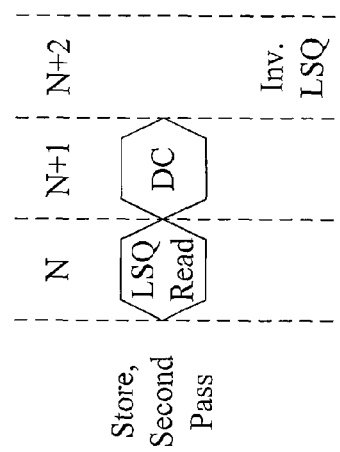
FIG. 3 is a timing diagram illustrating a plurality of pipeline stages processing a store memory operation during a second pass through a portion of the pipeline.

In one embodiment, completing the store operation may include a second pass through at least one pipeline stage in the load/store pipeline. An example is shown in FIGS. 2 and 3, and discussed in more detail below. The second pass may be used, e.g., to update the data cache 30 or transmit the store to the interface unit 34. To perform the second pass, a hole in the load/store pipeline may be needed so that the store operation may use the pipeline stage(s). If a store memory operation is ready for its second pass (e.g. older memory operations have been executed and older stores, at least to the same address, have been committed), the LSU 32 may await a hole in the pipeline (via the scheduler 20 not issuing a load/store operation) and may perform the second pass of the store operation. Alternatively, the LSU 32 may request a hole from the scheduler 20, or both waiting for a hole and requesting a hole (e.g. if the LSQ 36 is filling and an older store is ready for its second pass) may be implemented. In some embodiments, the data memory of the data cache 30 is not accessed during the first pass, and a store's second pass may occur in parallel with the first pass of another store.

In embodiments that use the two pass mechanism for store memory operations, exception reporting may be part of the first pass through the pipeline, and thus the store operation may be retired from the scheduler 20 prior to the second pass. In some cases, the second pass may occur prior to retirement (e.g. if retirement is delayed for reasons other than the store itself), but retirement is not dependent on the second pass.

In some cases, a memory operation may be replayed by the LSU 32. Generally, replay may cause the scheduler 20 to reschedule (reissue) the memory operation for execution. Particularly, a memory operation may be replayed by the LSU 32 if the memory operation is assigned an LSQ entry that is still in use for a retired store that has not yet completed. Such a scenario may occur since the scheduler 20 frees the LSQ entry for a store operation responsive to retiring the store operation, which may occur before the store is completed. Other replay scenarios may also occur in various embodiments. For example, if a load is executed out of order with respect to a previous store but accesses one or more bytes updated by the store, the load may be replayed in response to execution of the previous store. The scheduler 20 receives the replay signal, and may update its state to cause the replayed operation to be rescheduled at a later time. The scheduler 20 may also reschedule any subsequent microops, or subsequent microops that are dependent on the microop that is replayed. In one embodiment, the scheduler 20 may track which microops are in which pipeline stages in the execution core 24, and may thus associate the replay signal with the appropriate microop. In other embodiments, the replay signal may also identify the microop to the scheduler 20 or may be accompanied by an identifier (e.g. the SCH#).

In addition to maintaining the LSQ 36, the LSU 32 may have various other functions in some embodiments. For example, the LSU 32 may also enforce various load/store ordering rules, handle synchronization of memory operations as needed, participate in cache miss handling, etc. While a combined LSQ 36 has been described above, other embodiments may implement separate load and store queues.

The register file 22 may generally comprise any set of registers usable to store operands and results of microops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The interface unit 24 may generally include the circuitry for interface the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

While the embodiment of FIG. 1 shows the execution core 24 including an address generation unit 26, a translation unit 28, a load/store unit 32, and a data cache 30, other embodiments may include any desired components. For example, multiple address generation units, translation units, load/store units, and/or data caches may be provided. Other units may be provided as well (e.g. one or more integer units, one or more floating point units, one or more graphics units, one or more cryptographic units, etc.). Generally, the execution core 24 may include any circuitry for executing instructions (or microops, in the illustrated embodiment).

It is noted that, while the illustrated embodiment uses a scheduler, other embodiments may implement other microarchitectures. For example, a reservation station/reorder buffer microarchitecture may be used. The reorder buffer may include a retire unit similar to the retire unit 44. If in-order execution is implemented, other microarchitectures without out of order execution hardware may be used.

Turning now to FIGS. 2 and 3, timing diagrams are shown for one embodiment of a load/store pipeline that may be implemented by one embodiment of the processor 10. Generally, a pipeline comprises a plurality of pipeline stages (or, more briefly, "stages") in which various portions of processing are performed. In FIGS. 2 and 3, clock cycles are delimited by vertical dashed lines, and are numbered at the top. Various actions that occur for stores at certain pipeline stages are shown in FIGS. 2 and 3 as well.

FIG. 2 illustrates the first pass of a store operation through the load/store pipeline. In clock cycle 0, the scheduler issues the store operation for execution (Sch stage in FIG. 2). The scheduling of a microop may occur over several clock cycles, in some embodiments, and the Sch stage may represent the last of the stages. The register operands are read from the register file 22 in clock cycle 2 (RR stage). The address generation unit 26 executes the address generation during clock cycle 3 (AG stage) and the translation unit 28 translates the address during clock cycle 4 (TR stage). The data cache tags in the data cache 30 are accessed to determine hit/miss in the data cache 30 during clock cycle 5 (DT stage). Additionally, the DT stage is when the LSQ 36 is written with the store address, data, and any other state in this embodiment ("Write LSQ" in FIG. 2). The data cache data memory is accessed in clock cycle 6 (DC stage), although in this embodiment the data cache data memory may not be accessed during the first pass of the store operation (since the store data is not yet ready to be committed). Clock cycle 7 is the exception reporting stage (Exc Rept in FIG. 2), and the exceptions, if any, detected during execution of the store are reported to the scheduler 20 in this stage. Clock cycle 8 is the stage in which the scheduler 20 changes the status of the store operation to retired (assuming no exceptions are reported—Ret1 stage). In clock cycle 9, the store operation is selected for retirement (Ret2 stage), and in clock cycle 10 the scheduler 20 clears the scheduler entry assigned to the store operation (Ret3 stage). Thus, the scheduler entry becomes available to store another microop. Additionally, in the Ret3 stage, the scheduler 20 frees the LSQ entry assigned to the store operation in the mapper 18 ("Free LSQ#" in FIG. 2). Thus, subsequent to the Ret3 stage, the mapper 18 may reassign the LSQ entry to another load/store operation.

It is noted that, while the pipeline stages in FIG. 2 are illustrated as occurring in consecutive clock cycles, there may be intervening clock cycles in some cases. In one embodiment, an issued instruction executes through the portion of the pipeline implemented in the execution core 24 without stall (e.g. the RR, AG, TR, DT, DC, and Exc Rept stages). Additionally, the Ret1 state may occur without delay from the Exc Rept stage, in one embodiment. However, there may be a delay before the store operation is selected in the Ret2 stage (e.g. if earlier microops in the scheduler 20 have not yet been retired). Once the store operation is selected, the Ret3 stage may occur without delay from the Ret2 stage, in one embodiment.

FIG. 3 illustrates the second pass of the store operation. In the second pass, the store operation may pass through at least one pipeline stage that it passed through on the first pass. Particularly, in the illustrated embodiment, the store operation may pass through the DC stage (clock cycle N+1 in FIG. 3) to update the data cache data memory with the store data.

In the illustrated embodiment, the store operation is selected for the second pass and the LSQ 36 is read to obtain the store operation state (address, data, etc.) in clock cycle N (LSQ read stage in FIG. 3). The store operation passes to the DC stage in clock cycle N+1. In clock cycle N+2, the LSQ entry may be invalidated. In the DC stage, the store operation may also be merged into the store merge buffer, if applicable, and non-cacheable stores may be provided to the interface unit 34. In one embodiment, invalidation of a non-cacheable store in the LSQ 36 may be delayed until the non-cacheable store is successfully transmitted on the external interface (e.g. the address phase has completed successfully).

The second pass of the store operation may overlap with the first pass, in some cases. For example, the second pass LSQ read stage (clock cycle N) may overlap with the first pass Exc Rept stage (clock cycle 7), in one embodiment, for the most rapid initiation of the second pass that is supported in the embodiment. That is, the second pass clock cycle N may occur no earlier than the first pass Exc Rept stage (clock cycle 7) in one embodiment. Such a rapid initiation of the second pass may occur, e.g., if the LSQ 36 is empty or the store operation is the oldest store operation in the LSQ 36 upon writing the store operation to the LSQ 36. The second pass may be initiated at any subsequent clock cycle, based on various factors such as position in the LSQ 36, ordering and synchronization constraints, availability of a pipeline hole, etc.

FIGS. 4-7 are flowcharts illustrating operation of one embodiment of various components of the processor 10, at various points in the processing of store operations. The blocks in each flowchart are shown in an order for ease of understanding. However, other orders may be used. Furthermore, blocks may be implemented in parallel in combinatorial logic in the components. Blocks, combinations of blocks, or the flowcharts as a whole may be pipelined over multiple clock cycles.

Figure 4:
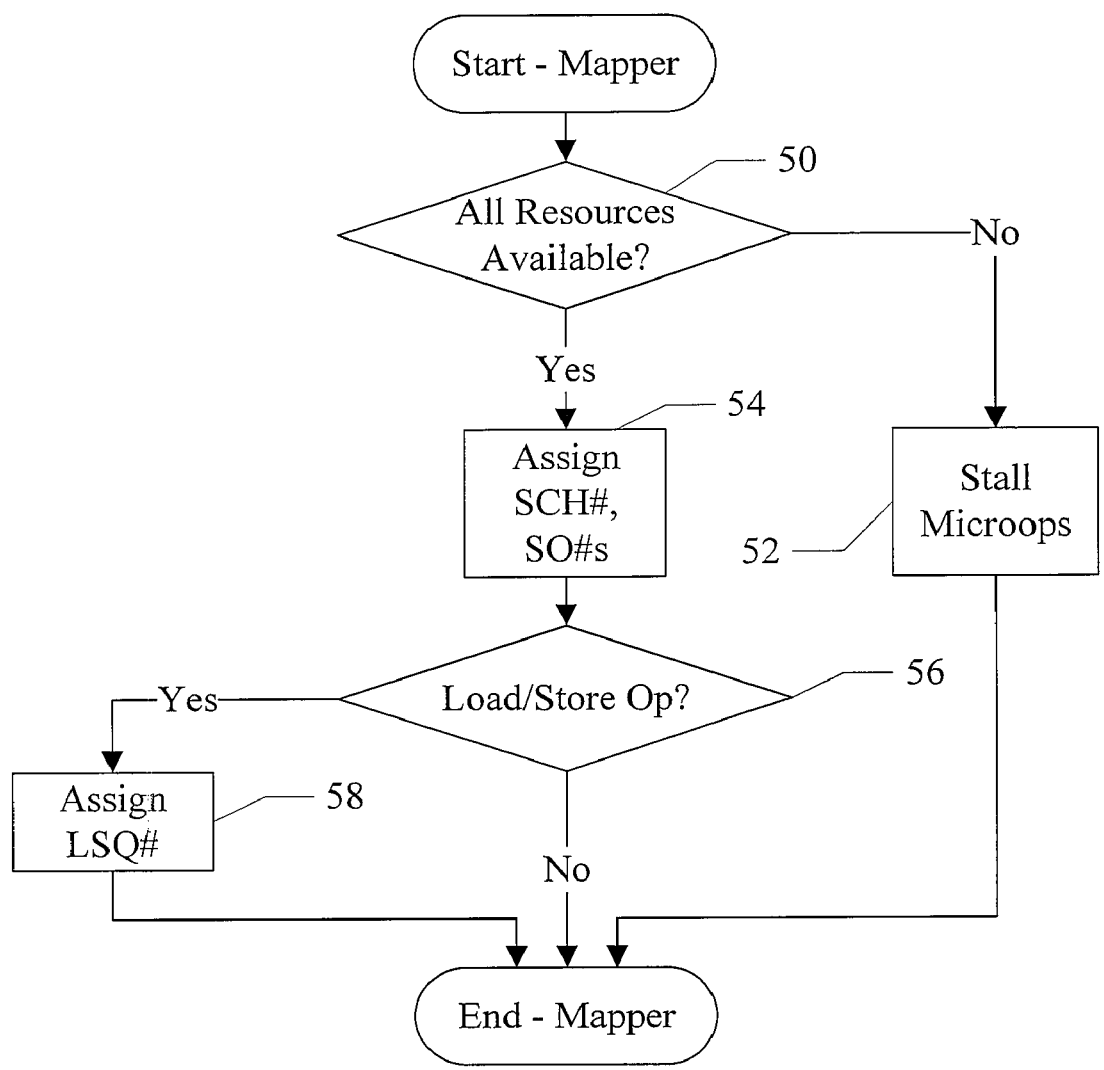
FIG. 4 is a flowchart illustrating operation of one embodiment of a mapper shown in FIG. 1.

FIG. 4 is a flowchart illustrating operation of the mapper 18 for one embodiment, in response to receiving one or more microops from the decode unit 16.

The mapper 18 may determine if all mapper resources that will be consumed by the microops are available for assignment (decision block 50). For example, the resources may include scheduler entries, destination registers (if different than scheduler entries), and LSQ entries for load/store operations. If at least one resource is not available (decision block 50, "no" leg), the mapper 18 may stall the microops until the resources become available (e.g. via the retirement of previous microops) or until the pipeline is flushed due to exception, redirect, etc. (block 52). Alternatively, in other embodiments, if enough resources are available for the initial microops received by the mapper 18, those microops may be processed and the remaining microops may be stalled.

If the resources are available, the mapper 18 may assign the scheduler number (SCH#) to each microop, identifying the scheduler entry in the buffer 46 that is to store the microop and the destination register in the register file 22, in this embodiment. Additionally, the mapper 18 may assign the SO#s based on the current mapping of logical registers to physical registers in the register file 22 (block 54). Thus, the SO#s identify registers in the register file 22 that are (or will be) storing the source operands for the microop. For each microop that is a load/store operation (decision block 56, "yes" leg), the mapper 18 may also assign an LSQ# identifying the LSQ 36 entry assigned to the load/store operation (block 58). The microops, SO#s, and LSQ#s may be written to the assigned scheduler entries to await scheduling and issuance.

Figure 5:
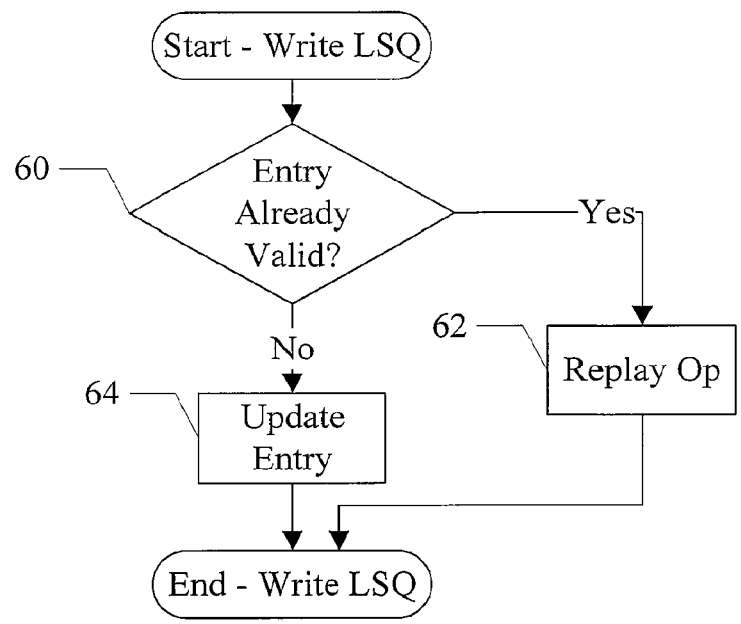
FIG. 5 is a flowchart illustrating operation of one embodiment of a load/store unit shown in FIG. 1 during writing of a load/store queue entry.

FIG. 5 is a flowchart illustrating operation of one embodiment of the LSU 32 during an attempt to write the LSQ 36 for a load/store operation in the DT stage. The LSU 32 may check the entry to be written, to determine if the entry is already valid (decision block 60). If the entry is valid, it may be storing a store operation that has completed its first pass and is awaiting its second pass, and which has been retired by the scheduler 20. In such a case (decision block 60, "yes" leg), the LSU 32 may assert the replay signal to replay the load/store operation that is in the DT stage (block 62). If the entry is not currently valid, the LSU 32 may update the entry with the information corresponding to the executed load/store operation, and may validate the entry (block 64).

Figure 6:
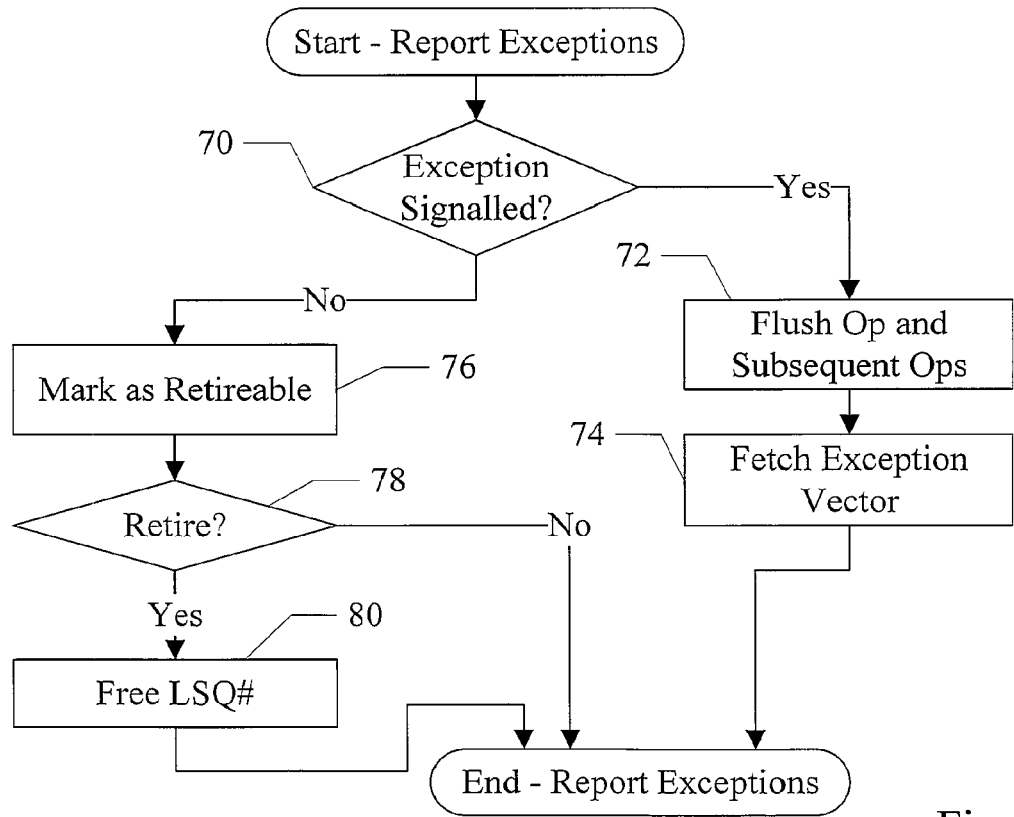
FIG. 6 is a flowchart illustrating operation of one embodiment of a scheduler shown in FIG. 1 in response to exception reporting corresponding to a store memory operation.

FIG. 6 is a flowchart illustrating operation of one embodiment of the scheduler 20 (and more particularly the retire unit 44, for at least a portion of FIG. 6) during the report exceptions stage of a memory operation (e.g. the Exc Rept stage shown in FIG. 2).

If the memory operation is reporting an exception (decision block 70, "yes" leg), the scheduler 20 may flush the buffer 46 of the memory operation and any subsequent operations (block 72) and may fetch the exception vector for the identified exception (block 74). It is noted that the flushing of the buffer and the fetching of the exception vector may be delayed until the memory operation would otherwise be retireable.

If the memory operation is not reporting an exception (decision block 70, "no" leg), the retire unit 44 may mark the operation as retireable (block 76). In the case of a store operation, the store operation is marked as retireable based on the exception reporting in the first pass, potentially prior to the second pass and prior to completion of the store operation. If the memory operation is selected to be retired by the retire unit 44 (decision block 78, "yes" leg), the memory operation is cleared from the scheduler 20 and the scheduler 20 may free the LSQ# assigned to the memory operation in the mapper 18 (block 80). The memory operation may be selected for retirement by the retire unit 44 if the memory operation is marked as retireable and previous microops have been retired or are concurrently being retired. Blocks 76, 78, and 80 may be pipelined (e.g. as shown in FIG. 2, for one embodiment).

Figure 7:
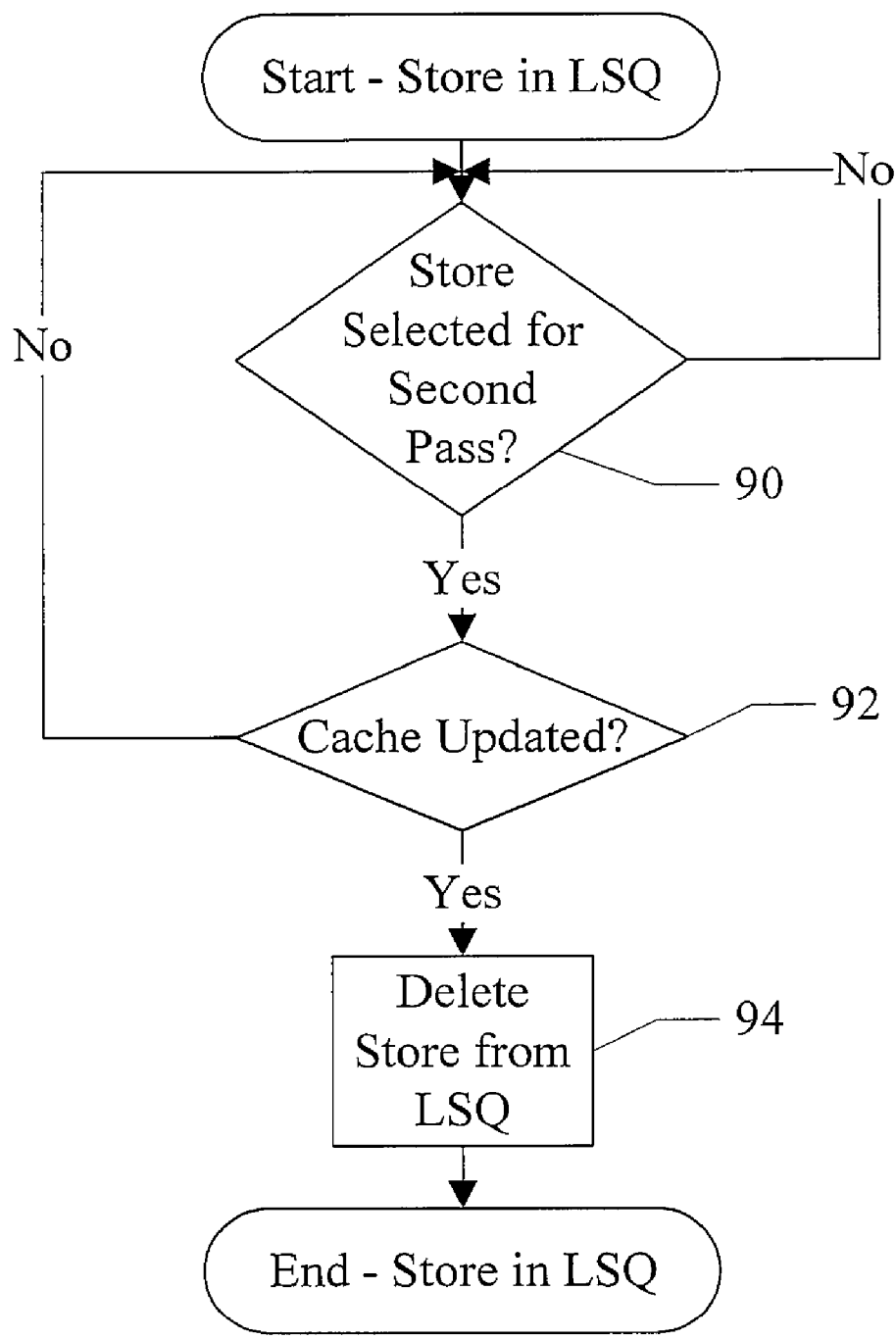
FIG. 7 is a flowchart illustrating operation of one embodiment of a load/store unit for a store memory operation in the load/store queue.

FIG. 7 illustrates operation of one embodiment of the LSU 32 for a store in the LSQ 36. The LSU 32 may select the store for its second pass (decision block 90). A variety of factors may affect whether or not the store is ready for its second pass. For example, in some embodiments, each older memory operation must have successfully executed before the store is ready for its second pass. If any older memory operations are to the same address (at a desired granularity, such as a cache block), the store may not be ready for its second pass unit the older memory operations are completed. A hole in the load/store pipeline (either from a first pass of another store operation or due to no issuance of a load/store operation by the scheduler 20) may also affect whether or not the store is ready to be selected. In the case of a cache miss, the LSU 32 may await fill data. In other embodiments, the store may be transmitted to the interface unit 34, where a memory request buffer entry may be used as a store merge buffer. Other conditions (e.g. synchronization, ordering, etc.) may impact whether or not the store is ready to be selected.

If the store is selected for its second pass (decision block 90, "yes" leg), the LSU 32 may await successful cache update (or successful transmission to the interface unit 34 or successful transmission on the external interface, for non-cacheable stores) (decision block 92, "yes" leg). The successfully completed store may then be deleted from the LSQ 36 (block 94). For example, the entry may be invalidated.

Numerous variations and modifications will become apparent to those skilled in the art once the above disclosure is fully appreciated. It is intended that the following claims be interpreted to embrace all such variations and modifications.

What is claimed is:

1. A scheduler comprising:
a buffer configured to store instruction operations awaiting issue, wherein the buffer is configured to store a first store memory operation; and
a retire unit coupled to the buffer, wherein the retire unit is configured to retire the first store memory operation from the buffer responsive to the first store memory operation having been processed at least to a pipeline stage at which exceptions are reported and prior to the first store memory operation being completed, and wherein the retire unit is coupled to receive a scheduler identifier from the pipeline stage at which exceptions are reported, and wherein the retire unit is configured to identify the first store memory operation in the buffer responsive to the scheduler identifier, and wherein retiring the first store memory operation comprises releasing resources used to track the first store memory operation as a speculative operation, including resources in the buffer, wherein the first store memory operation remains represented in a queue within a load/store unit subsequent to the retiring.

2. The scheduler as recited in claim 1, wherein the scheduler is configured to free a first entry in the queue within a load/store unit assigned to the first store memory operation responsive to retiring the first store memory operation.

3. The scheduler as recited in claim 1 wherein the buffer is configured to store a first identifier of an entry in the queue that stores data representing the first store memory operation, and wherein the scheduler is configured to issue the first identifier with the first store memory operation for execution of the first store memory operation.

4. The scheduler as recited in claim 3 wherein the scheduler is coupled to receive the first identifier from a mapper that assigns the entry to the first store memory operation when the first store memory operation is decoded and transmitted to the scheduler.

5. A processor comprising:
a scheduler configured to schedule a first store memory operation to be executed, wherein the first store memory operation is assigned to a first entry in a queue in a load/store unit prior to being written to the scheduler, wherein the scheduler includes a buffer storing the first store memory operation and further storing a first identifier corresponding to the first entry; and
the load/store unit coupled to receive the first identifier during execution of the first store memory operation, wherein the load/store unit comprises the queue and is configured to update the first entry responsive to the first identifier;
wherein the scheduler is configured to retire the first store memory operation from the buffer responsive to the first store memory operation having been processed at least to a pipeline stage at which exceptions are reported and prior to the first store memory operation being completed, and wherein the scheduler is coupled to receive a scheduler identifier from the pipeline stage at which exceptions are reported, and wherein the scheduler is configured to identify the first store memory operation in the buffer responsive to the scheduler identifier, and wherein retiring the first store memory operation comprises releasing resources used to track the first store memory operation as a speculative operation, including resources in the buffer; and
wherein the first store memory operation remains represented in the queue within the load/store unit subsequent to the retiring.

6. The processor as recited in claim 5 further comprising a mapper coupled to the scheduler, wherein the mapper is configured to assign the first entry in the queue to the first store memory operation and to provide the first store memory operation and the first identifier to the scheduler, and wherein the scheduler is configured to allocate storage in the buffer for the first store memory operation responsive to receiving the first store memory operation from the mapper.

7. The processor as recited in claim 6 wherein the mapper is configured to reassign the first identifier to a subsequent memory operation responsive to the first store memory operation being retired.

8. The processor as recited in claim 7 wherein the scheduler is configured to allocate storage for the subsequent memory operation in response to receiving the subsequent memory operation from the mapper, and wherein the scheduler is configured to schedule the subsequent memory operation to be executed.

9. The processor as recited in claim 8 wherein the load/store unit is configured to detect that the first entry remains occupied by the first store memory operation during execution of the subsequent memory operation, and wherein the load/store unit is configured to signal a replay of the subsequent memory operation responsive to detecting that the first entry remains occupied by the first store memory operation to preserve store state corresponding to the first store memory operation in the first entry.

10. The processor as recited in claim 9 wherein the load/store unit is configured to delete the first store memory operation from the queue responsive to the first store memory operation completing.

11. The processor as recited in claim 10 wherein the load/store unit is configured not to replay the subsequent memory operation responsive to deleting the first store memory operation from the queue.

12. The processor as recited in claim 11 wherein the first store memory operation is completed by updating a data cache in the processor with store data corresponding to the first store memory operation.

13. The processor as recited in claim 11 wherein the first store memory operation is completed by enqueueing store data for transmission to an external memory.

14. A method comprising:
a scheduler scheduling a first store memory operation to be executed, wherein the first store memory operation is assigned to a first entry in a queue in a load/store unit prior to being written to the scheduler, wherein the scheduler includes a buffer storing the first store memory operation and further storing a first identifier corresponding to the first entry;
a load/store unit receiving the first identifier during execution of the first store memory operation, wherein the load/store unit comprises the queue;
the load/store unit updating the first entry responsive to the first identifier;
the scheduler retiring the first store memory operation from the buffer responsive to the first store memory operation having been processed at least to a pipeline stage at which exceptions are reported and prior to the first store memory operation being completed, and wherein the scheduler is coupled to receive a scheduler identifier from the pipeline stage at which exceptions are reported, and wherein the scheduler is configured to identify the first store memory operation in the buffer responsive to the scheduler identifier, and wherein retiring the first store memory operation comprises releasing resources used to track the first store memory operation as a speculative operation, including resources in the buffer; and
retaining data corresponding to the first store memory operation in the queue within the load/store unit subsequent to the retiring.

15. The method as recited in claim 14 further comprising:
a mapper assigning the first entry in the queue to the first store memory operation;
the mapper providing the first store memory operation and the first identifier to the scheduler; and
the scheduler allocating storage in the buffer for the first store memory operation responsive to receiving the first store memory operation from the mapper.

16. The method as recited in claim 15 further comprising the mapper reassigning the first identifier to a subsequent memory operation responsive to the first store memory operation being retired.

17. The method as recited in claim 16 further comprising:
the scheduler allocating storage for the subsequent memory operation in response to receiving the subsequent memory operation from the mapper;
the scheduler scheduling the subsequent memory operation to be executed;
the load/store unit detecting that the first entry remains occupied by first store memory operation during execution of the subsequent memory operation; and
the load/store unit signalling a replay of the subsequent memory operation responsive to detecting that the first entry remains occupied by the first store memory operation to preserve store state corresponding to the first store memory operation in the first entry.

18. The method as recited in claim 17 further comprising the load/store unit deleting the first store memory operation from the queue responsive to the first store memory operation completing.

19. The method as recited in claim 18 further comprising:
the scheduler rescheduling the first store memory operation; and
the load/store unit not replaying the subsequent memory operation responsive to deleting the first store memory operation from the queue.

20. The method as recited in claim 18 wherein the first store memory operation is completed by updating a data cache in the processor with store data corresponding to the first store memory operation.

21. The method as recited in claim 18 wherein the first store memory operation is completed by enqueueing store data for transmission to an external memory.

* * * * *